Patented Apr. 28, 1936

2,038,751

UNITED STATES PATENT OFFICE 2,038,751

COATING

John D. Murray, Chicago, Ill., assignor to The Murray Liquafilm Corporation, Chicago, Ill., a corporation of Illinois No Drawing. Application February 2, 1933, Serial No. 654,887

9 Claims. (Cl. 154—2)

This invention relates to materials for forming protective coatings and the like, and to their use and application as such coatings, and especially those materials made with a base of cellulose ester such as cellulose nitrate or acetate or other cellulose plastic.

An important object of the invention is to provide a flexible and glossy coating of this character for sheets of paper which have been printed or lithographed, and which is of such material that it will not cause "bleeding" or blurring of the ink. It is highly desirable that this coating be capable of application even if the ink is not entirely dry, and that it be capable of being applied by a printing process so that it may if desired be put on as a continuation of, or in fact substantially as a part of, the process of printing or lithographing.

A material suitable for use in this manner consists of, dissolved in an alcohol-free solvent consisting for example of 20% ethyl acetate and 20% butyl acetate with the balance toluol, the following, viz: cellulose nitrate or other cellulose or pyroxyline plastic base, 20 to 60 parts; plasticizer, 1 to 40 parts; ester gum 20 to 80 parts. For the plasticizer there may be used one or a mixture of tricresyl phosphate, triphenyl phosphate, diamyl phthalate, dibutyl phthalate, ethoxyethyl phthalate, and methoxyethyl phthalate.

The amount of plasticizer used depends on the thickness of, and the flexibility required of, the resultant coating. The amount is relatively small, for example, for a coating to protect the printing or lithographing on a relatively stiff heavy cardboard, and increases as greater flexibility is desired. The amount also varies according to the thickness of the coating. The ester gums form a group of substances well known commercially under trade names such as Amberol and Beckecite, a typical ester gum being a glyptol resin compounded from a natural resin and a synthetic phenol resin mixed with glycerine; or gum damar may be used.

A specific formula of this character would be the following:

| | Parts by weight |
|---|---|
| Nitrocellulose | 40 |
| Diamyl phthalate | 18 |
| Ethoxyethyl phthalate | 2 |
| Ester gum | 20 | all dissolved in the above-described solvent. In applying this coating to protect printed or lithographed surfaces (hereinafter for convenience referred to, with other inked surfaces, generically as "printed surfaces"), it is important that the solvent should not contain alcohol, as is customary in solvents for similar compositions heretofore in use.

Ordinary plasticizers, as for example 85–88% ester content diamyl phthalate, lose substantially in weight in the course of time. I reduce this loss in part by using diamyl phthalate of around 99% ester content, and also by adding the ethoxyethyl phthalate which compensates for any slight loss remaining. The addition of a minute quantity (e. g. one ounce to each fifty gallons) of zinc oxide counteracts any tendency to tackiness when a high percentage of plasticizer is used.

According to an important feature of the invention, a novel method of application permits the use of a relatively viscous solution, for example approximately six pounds of the above listed materials (conveniently referred to hereinafter as the "solids") per gallon of solvent. Heretofore such concentrations have not been commercially usable, as the ordinary varnish machine or other known means of applying the solution require a relatively thin solution, as for example around two pounds of solids per gallon. Since the area covered is proportional to the amount of solids, while the cost of the viscous solution is not much greater (perhaps one-fourth greater) than the thin solution, it will be seen that this greatly reduces the cost of the final coating, calculated in cents per square foot.

This is accomplished, according to my invention, by not applying the solution directly to the relatively rough and porous paper surface, but by first applying it (preferably under substantial pressure which aids in smoothing it out) to a non-absorbent surface such as a metal roller or a curved or flat metal plate, then allowing it to distribute itself uniformly and at the same time evaporating a part of the solvent, and then transferring the tacky film so formed, under considerable pressure, directly to the paper or other surface which is to receive it.

This method of application is especially advantageous in that it can be applied in standard printing machinery, in some cases during the process of printing and substantially as a part of that process. This is accomplished by feeding the material, by a roller or the like turning in a fountain containing the supply of material as more fully described in application No. 681,837 filed July 24, 1933 jointly by myself and Mortimer S. North in a thin film to a transfer roller or flat or curved transfer plate, preferably held under pressure against the feed roller.

The film on the transfer surface is given sufficient time to distribute itself uniformly, and to evaporate off a part of the solvent (under heat if desired), and is then transferred bodily by being pressed under considerable pressure against the label or other printed surface which is to receive the protective coating. As explained further below, the coated article is then dried or heated to drive off the remaining solvent.

The viscosity of the material applied as described above, instead of being varied entirely by changing the amount of solvent, is preferably varied in large part by selection of the cellulose nitrate or its equivalent. On hard surfaces, such as litho-coated papers or glassine, I prefer to use a cellulose nitrate of one-quarter or one-half second viscosity, making up the entire mixture with about three to six pounds of the above formula to each gallon of solvent. On more porous papers, such as manila and kraft papers, the same proportion may be maintained, but a cellulose nitrate of from 20 to 30 seconds viscosity may be used. In coating a cellulose xanthate transparent sheet or "paper", however, I find it preferable to reduce the amount of the formula per gallon of solvent to around 1.4 pounds, using cellulose nitrate of around half second viscosity.

In all these cases, the coating when applied by the process described above, will dry before undesirable penetration of the paper takes place. This coating, applied as described, sets the ink even though not already dry, it prevents "crocking" (the reaction of one ink on another), it of course protects the printed surface and makes it substantially moisture-proof, it makes the paper more flexible by partial impregnation, it gives a surface having a high gloss, it increases the reflective value of and therefore intensifies the colors, and it increases the depth of the tonal values of the colors.

Heretofore inks for printing on cellulose xanthate or other regenerated cellulose "papers" or flexible sheets have been restricted to aniline and similar non-metallic coloring materials. One advantage of the above-described composition is that metallic pigments may be mixed with it for printing directly on such regenerated cellulose sheets. This is rendered feasible in part by the formula of the composition, and in part by its adaptability for being applied by the above-described process, which may be taken advantage of to apply the coating to the sheet in printed designs as well as in a continuous coating.

The above-described coating has a fairly high degree of moisture-proofing characteristic, especially in coatings .001 inch or more thick. For uses where a still higher degree of moisture-proofing is desired, and especially for coatings .001 inch or less thick, according to another feature of the invention I add to the formula from 2 to 25 parts of paracumarone-paraindene resin, a synthetic resin made in various grades from coal-tar naphtha and known commercially as "cumar". Ordinarily I prefer to use the grades known commercially as P 10 and P 25, although for very thin solutions I may sometimes use grade BX or CX.

The above specific formula, for example, may then be amplified for this purpose to include:

| | Parts |
|---|---|
| Nitrocellulose | 40 |
| Diamyl phthalate | 18 |
| Ethoxyethyl phthalate | 2 |
| Ester gum | 20 |
| Cumar | 20 |

The greater the moisture-proofing characteristic desired, the more cumar is added, and therefore ordinarily the thinner the final coating is to be, the greater the amount of cumar in the formula. The above specific formula is suitable for coatings substantially less than .001 inch thick. For this reason, the very thin coating on a cellulose xanthate sheet will contain a considerable amount of cumar and, being inherently flexible, a relatively small amount of plasticizer, whereas the relatively thick coating on a lithographed sheet of paper will contain a relatively small amount of cumar and a considerable amount of plasticizer.

According to an important feature of the invention, when cumar is used the coating is dried to drive off the remaining solvent at a temperature slightly above the temperature at which cumar crystallizes. With the grades named above this would be around 90° to 100° centigrade. This results in driving off the solvent completely before the cumar sets, whereupon the cumar flows into all the pores and interstices in the coating, especially at its surface, completely filling them. When the cumar is then allowed to cool, after all the solvent is driven off, it is deposited in these pores and gives a continuous moisture-impervious coating.

The cumar in no way detracts from the flexibility or other desirable characteristics of the coating. The final coating is not only flexible and moisture-proof, but is also non-tacky, odorless, transparent, and does not feel greasy. After drying, it may be treated with steam or the like to insure the removal of any last traces of the solvent, and to insure maximum flexibility.

While the advantages of particular materials and proportions has been set forth above in considerable detail, it is not my intention to limit the scope of my invention to those exact materials and proportions, or otherwise than by the terms of the appended claims.

I claim:

1. A method of protecting a printed surface or the like with a moisture proof coating comprising coating the surface with a composition containing a cellulose derivative base and a plasticizer and ester gum and paracoumarone-indene resin with a solvent with sufficient solvent to dissolve the composition, drying the coating so formed to drive off all the solvent above the temperature of crystallization of the paracoumarone-indene resin, and then cooling the coating to set the paracoumarone-indene resin after the solvent is driven off, whereby a continuous moisture-impervious coating is provided.

2. A method of protecting a printed surface or the like with a moisture proof coating comprising coating the surface with a composition containing a cellulose derivative base and a plasticizer and ester gum and paracoumarone-indene resin and a solvent with sufficient solvent to dissolve the composition, drying the coating so formed to drive off all the solvent at a temperature of approximately 90° to 100° C., and then cooling the coating to set the paracoumarone-indene resin after the solvent is driven off, whereby a continuous moisture-impervious coating is provided.

3. A method of protecting a printed surface or the like comprising coating the surface with a composition containing paracoumarone-indene resin and a solvent with sufficient solvent to dissolve the composition, drying the coating so formed to drive off the solvent above the temperature of crystallization of the paracoumarone-indene resin, and cooling the coating to set the paracoumarone-indene resin after the solvent is driven off.

4. A method of protecting a printed surface or the like with a moisture proof coating comprising coating the surface with a composition containing paracoumarone-indene resin and a solvent with sufficient solvent to dissolve the composition, drying the coating so formed to drive off the solvent above the temperature of crystallization of the paracoumarone-indene resin, and cooling the coating slowly enough to permit the paracoumarone-indene resin to set in the interstices and upon the surface of the coating, whereby a continuous moisture-impervious coating is provided.

5. A method of forming a protected printed surface or the like comprising printing or lithographing the surface, forming on an unabsorbent transfer surface a thin film containing a cellulose base and a plasticizer and ester gum and paracoumarone-indene resin and a solvent with sufficient solvent to dissolve the composition, allowing the film to distribute itself on said surface and at the same time to lose part of its solvent, transferring the film from said surface to the printed surface under pressure, and drying the coated printed surface and driving off the solvent above the temperature of crystallization of the paracoumarone-indene resin and then cooling it to set the paracoumarone-indene resin.

6. An article having a printed surface protected and enhanced by a thin, flexible, transparent coating consisting of approximately:

| | Parts |
|---|---|
| Cellulose plastic base | 40 |
| Diamyl phthalate | 18 |
| Ethoxyethyl phthalate | 2 |
| Ester gum | 20 |
| Paracoumarone-indene resin | 20 | and with the paracoumarone-indene resin crystallized in the interstices and on the surface of the coating to intensify the moisture resistance of the coating.

7. An article having a printed surface protected and enhanced by a thin, flexible, transparent coating consisting of:

| | Parts |
|---|---|
| Cellulose plastic base | 20 to 60 |
| Diamyl phthalate and ethoxyethyl phthalate | 1 to 40 |
| Ester gum | 20 to 80 |
| Paracoumarone-indene resin | 2 to 25 | and with the paracoumarone-indene resin crystallized in the interstices and on the surface of the coating to intensify the moisture resistance of the coating.

8. An article having a printed surface protected and enhanced by a thin, flexible, transparent coating comprising approximately:

| | Parts |
|---|---|
| Cellulose plastic base | 40 |
| Plasticizer | 20 |
| Ester gum | 20 |
| Paracoumarone-indene resin | 20 | and with the paracoumarone-indene resin crystallized in the interstices and on the surface of the coating to intensify the moisture resistance of the coating.

9. An article having a printed surface protected and enhance by a thin, flexible, transparent coating comprising:

| | Parts |
|---|---|
| Cellulose plastic base | 20 to 60 |
| Plasticizer | 1 to 40 |
| Ester gum | 20 to 80 |
| Paracoumarone-indene resin | 2 to 25 | and with the paracoumarone-indene resin crystallized in the interstices and on the surface of the coating to intensify the moisture resistance of the coating.

JOHN D. MURRAY.